April 10, 1951        H. M. BENGE        2,548,698
CURVE CUTTING SAWING APPARATUS
Filed Feb. 27, 1948        5 Sheets-Sheet 1

HUBERT M. BENGE,
Inventor

By

ATTORNEY

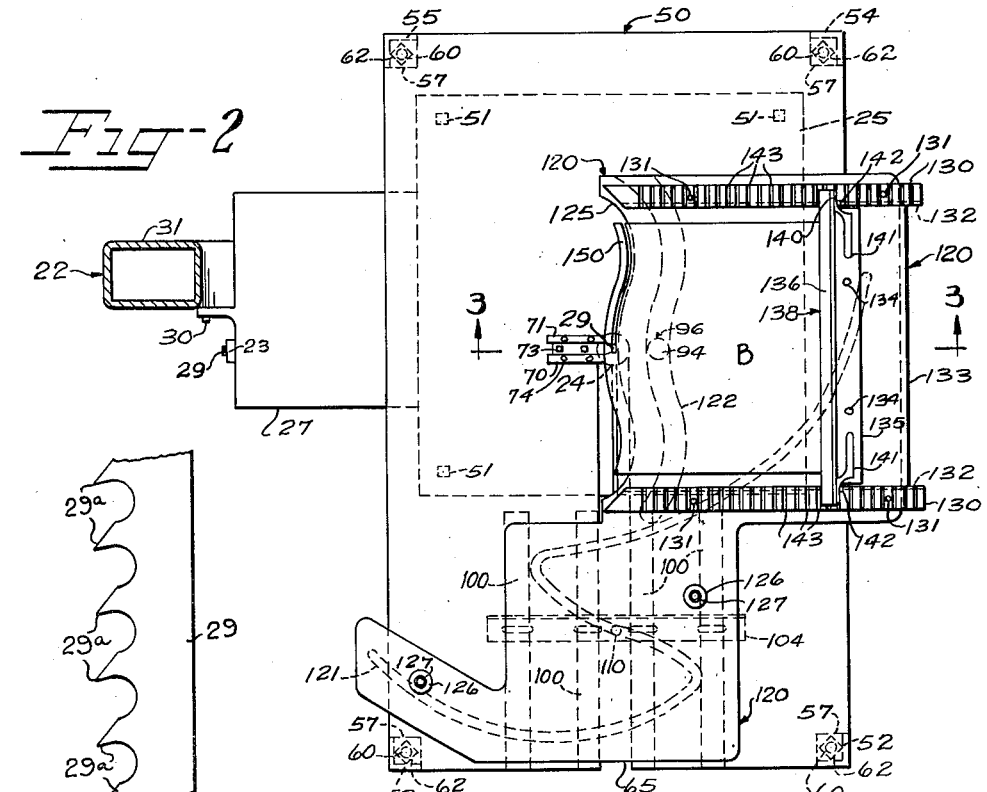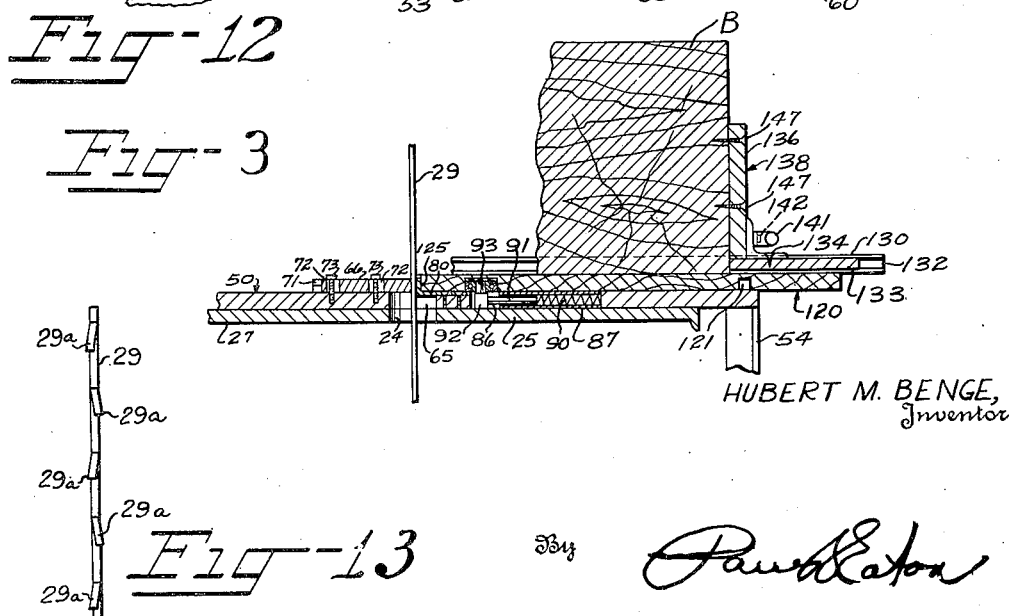

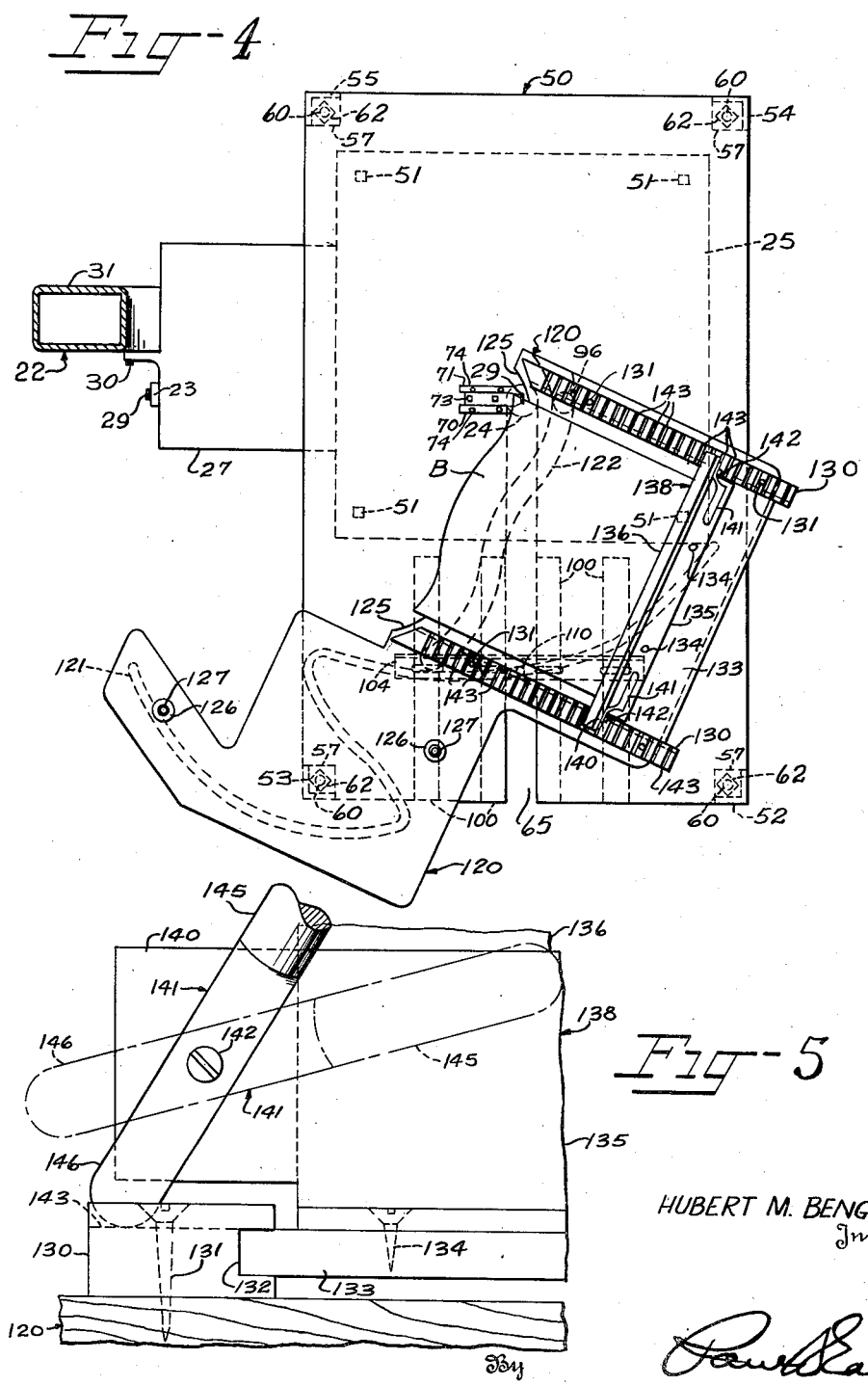

April 10, 1951     H. M. BENGE     2,548,698
CURVE CUTTING SAWING APPARATUS
Filed Feb. 27, 1948     5 Sheets-Sheet 4
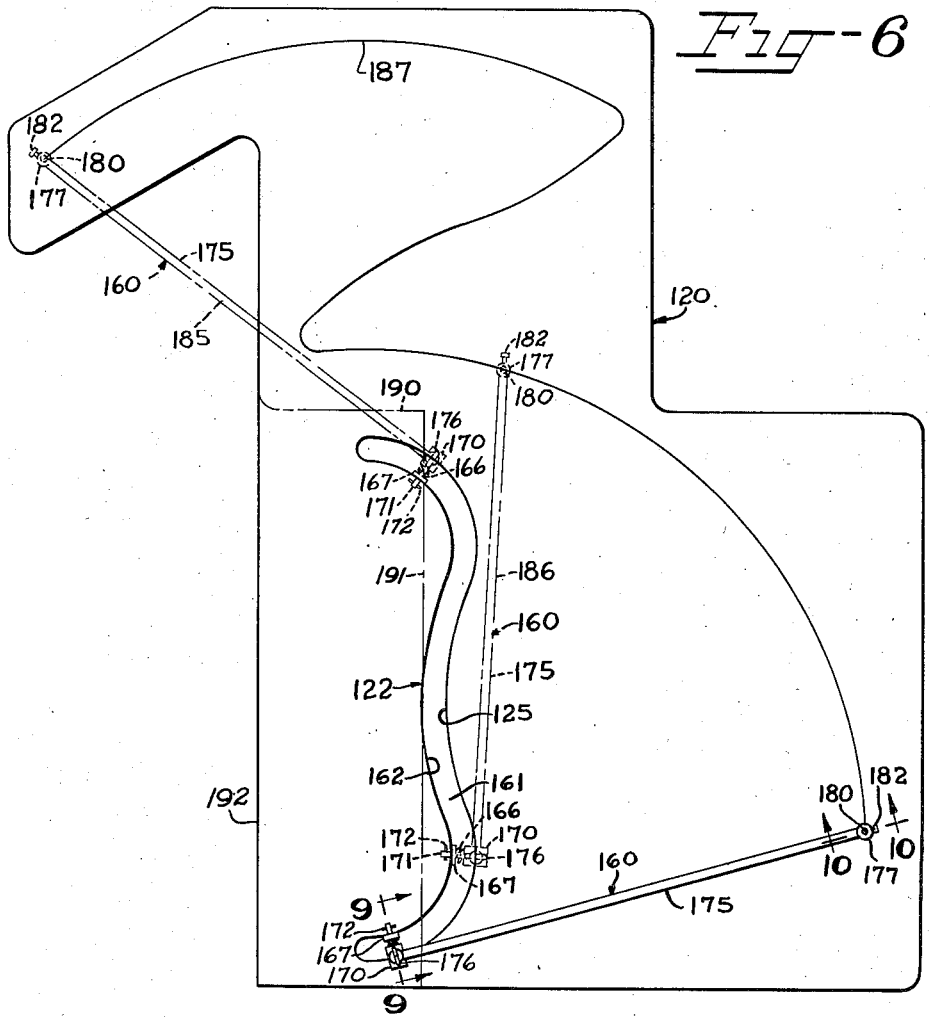
HUBERT M. BENGE,
Inventor April 10, 1951  H. M. BENGE  2,548,698
CURVE CUTTING SAWING APPARATUS
Filed Feb. 27, 1948  5 Sheets-Sheet 5
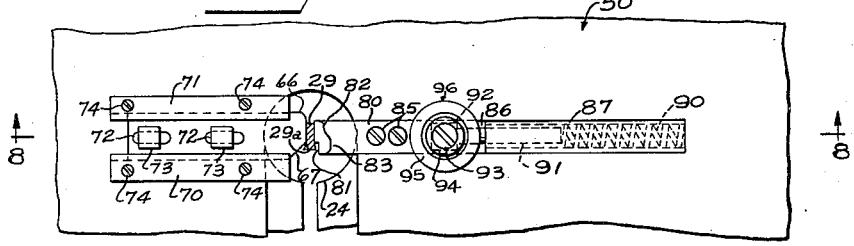
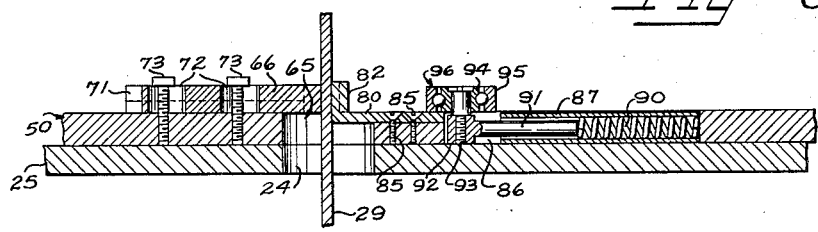
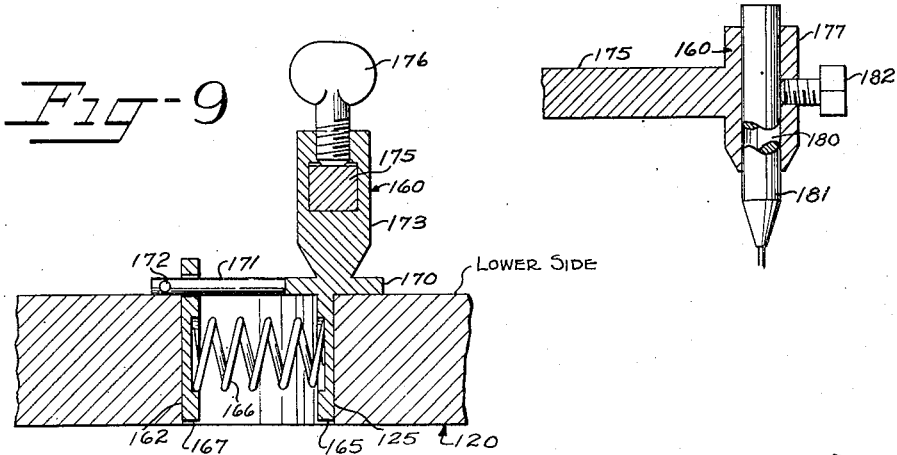
Inventor
HUBERT M. BENGE Patented Apr. 10, 1951

2,548,698

UNITED STATES PATENT OFFICE 2,548,698

CURVE CUTTING SAWING APPARATUS

Hubert M. Benge, Statesville, N. C.

Application February 27, 1948, Serial No. 11,422

6 Claims. (Cl. 143—171)

1

This invention relates to improvements in woodworking and woodcutting machinery, but more especially to a band-saw machine.

It is an object of this invention to provide a machine whereby any desired number of pieces of a given shape or pattern, whether they have straight, curved, or irregularly shaped edges, may, in constant succession, be accurately sawed or cut from a work piece of lumber, sheet metal, cardboard, leather, composition material and the like, and whereby the procedure of outlining the pattern, on the material from which the pieces are to be cut, may be eliminated except on the first piece to be made, which will be used as a pattern. This will not only save considerably in the cost of manufacture of a large number of pieces of like shape, but will also insure a more accurate similarity of the various pieces cut from the work piece.

This invention consists primarily of a movable pattern table in combination with a conventional band-saw machine, the pattern table having irregularly shaped grooves therein to be guided by rollers which project upwardly from a top table secured on the conventional table of the band-saw machine.

Some of the objects of the invention having been stated, other objects will appear as the description proceeds, when taken in connection with the accompanying drawings, in which:

Figure 2 is a plan view with parts in section and taken substantially along the line 2—2 in Figure 1;

Figure 3 is a vertical sectional view taken substantially along the line 3—3 in Figure 2 with parts broken away and being shown on an enlarged scale and omitting the saw teeth for sake of clarity;

Figure 4 is a view similar to Figure 2 but showing the pattern table and associated parts in a different position;

Figure 5 is an elevation on an enlarged scale taken substantially along the line 5—5 in Figure 1 and showing one of the locking means associated with the pattern table;

Figure 6 is a view looking up at the bottom of the pattern table normally associated with the machine before the same is completed for installation on the machine and showing the means for laying out one of the irregularly shaped curves associated therewith;

2

Figure 1:
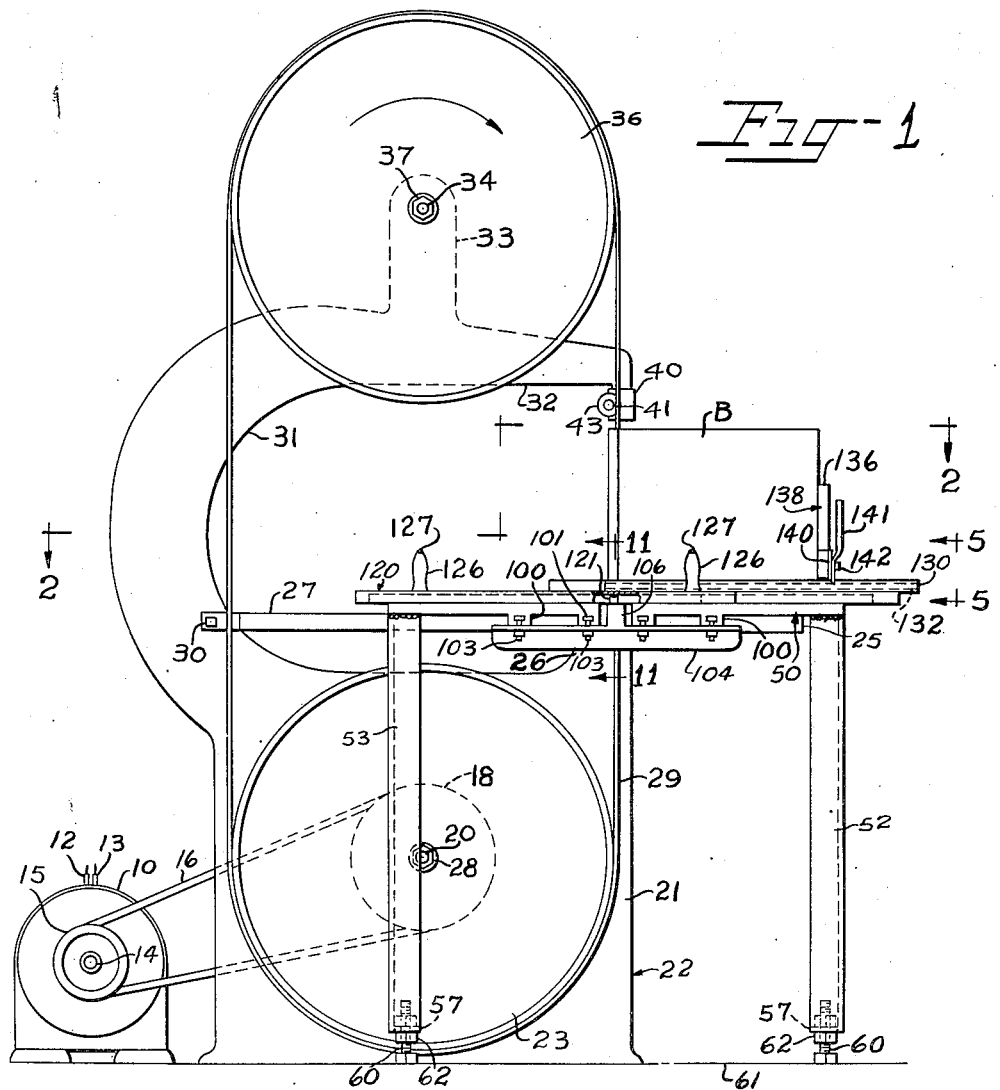
Figure 1 is a side elevation of a conventional band-saw machine showing the invention associated therewith and omitting the saw teeth for sake of clarity.
Figure 11:
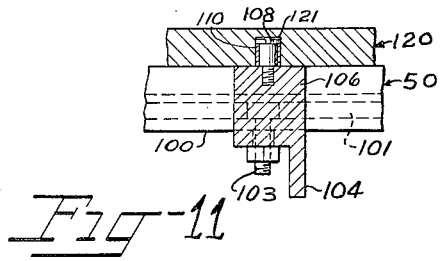

Figure 7 is a plan view, partly in section, of the central portion of Figure 2 with the movable pattern table omitted;

Figure 8 is a vertical sectional view taken along the line 8—8 in Figure 7;

Figure 9 is a vertical sectional view taken along the line 9—9 of Figure 6;

Figure 10 is a vertical sectional view taken along the line 10—10 in Figure 6;

Figure 11 (Sheet 1) is a vertical sectional view taken along the line 11—11 in Figure 1;

Figure 12 (Sheet 2) is a side elevation of a small portion of the band-saw blade;

Figure 13 is an edge view of a portion of the band-saw blade looking at the left-hand side of Figure 12.

Referring more specifically to the drawings the numeral 10 indicates an electric motor having electric wires 12 and 13 leading thereto from a suitable source of electrical energy, not shown. The electric motor 10 has a shaft 14 leading therefrom which has fixedly mounted thereon a pulley 15 on which is mounted a belt 16. The belt 16 extends to a pulley 18 which is fixedly mounted on a shaft 20 which is rotatably mounted in a portion 21 of a cast frame of a band-saw machine broadly designated as at 22.

The shaft 20 penetrates the cast frame 22 and has, fixedly mounted thereon, a lower wheel 23 on which is mounted an endless band-saw blade 29 having teeth 29a (Figures 12 and 13) integral therewith. The band-saw blade 29 extends upwardly through an opening 24 in a conventional horizontally disposed band-saw machine table 25. The band-saw machine table 25 is integral with an upwardly extending portion 26 of the cast frame 22 and has a rearwardly extending portion 27 which is secured by any suitable means such as a screw 30 to a cast gooseneck tubular portion 31 of the cast frame 22 which extends upwardly and curves over the table 25, and has a horizontally disposed arm 32 integral therewith.

The arm 32 has an upwardly extending bearing portion 33 in which is mounted a stub shaft 34 which extends towards the observer, as viewed in Figure 1, and has rotatably mounted thereon an upper idler wheel 36, by any suitable means such as a nut 37 threadably secured on the end of the shaft 34.

As heretofore stated the band-saw blade 29 passes through the opening 24 in the band-saw machine table 25 and is mounted on the wheel 36 heretofore described. The outwardly extending arm 32 of the frame 22 has a downwardly projecting portion 40 having a stub shaft 41 fixedly secured therein on which is rotatably mounted a conventional guide wheel 43 for guiding the band-saw blade 29.

The parts heretofore described are conventional parts of the band-saw machine and it is with these parts that this invention is adapted to be associated.

Fixedly mounted on the table 25, in a superposed relation thereto, is a top table broadly designated at 50 and the top table 50 is secured to the conventional table 25 by any suitable means such as screws 51. The top table 50, being larger in most instances than the conventional table 25, is further supported, at each corner thereof, by vertically disposed angle bars 52, 53, 54 and 55 which are secured to the lower surface of the top table 50 by any suitable means such as welding. The angle bars 52, 53, 54 and 55 extend downwardly and have horizontally disposed plate members 57 secured to the lower ends thereof, by any suitable means such as welding. These plate members 57 are each threadably penetrated by a screw 60 which is adapted to adjust the height of each corner of the top table 50 relative to a floor 61 and are secured in adjusted position by lock nuts 62.

The top table 50 has an elongated opening 65 therein which extends from the lower side of Figure 2 and terminates above and in alinement with the opening 24 in the conventional band-saw machine table 25. The front portion of the band-saw blade 29 passes through the opening 65 as well as the opening 24 and disposed above the openings 24 and 65 is a block 66 which engages the left-hand surface of the band-saw blade 29 (Figures 7 and 8) and has an angularly cut surface 67, which is so cut as to allow unimpeded passage of the teeth 29a of the band-saw blade 29.

This block 66 extends rearwardly or to the left, as observed in Figures 7 and 8, and is mounted for horizontal adjustment between guide bars 70 and 71. The block 66 has elongated slots 72 therein which are also for adjustment of the block 66 and these slots are penetrated by screws 73 which are threadably secured in the top table 50. The guide bars 70 and 71 are secured to the top table 50 by any suitable means such as screws 74.

The band-saw blade 29 is guided in close relation to the block 66 by an L-shaped bar 80 which engages the surface of the band-saw blade opposite the surface engaged by the block 66 and the band-saw blade 29 has downward vertical sliding movement between the block 66 and the bar 80. The bar 80 has an upwardly extending portion 82 and this portion 82 is cut away as at 81 so that the upwardly extending portion 82 will not be engaged by the teeth 29a of the band-saw blade 29. It may be observed in Figure 7 that the upwardly extending portion 82 also has a raised portion 83, which is directly opposite the teeth of the band-saw blade 29 so that engagement of the pattern, to be later described, may be insured as being opposite the teeth 29a of the band-saw blade 29.

The L-shaped bar 80 is secured to the top table 50 by any suitable means such as screws 85. Cut in the top table 50 adjacent to the end of the L-shaped bar 80 and extending from left to right, as observed in Figures 7 and 8, is a slot 86 in which a horizontally disposed tubular member 87 is fixedly mounted by a press fit or by welding.

The tubular member 87, in the slot 86, has a compression spring 90 disposed therein, the right-hand end of which (Figures 7 and 8) engages the right-hand end of the slot 86 in Figures 7 and 8, and the left-hand end engages the end of a horizontally disposed shaft 91 which extends to the left and has an enlarged portion 92 integral therewith. This portion 92 slidably fits in slot 86 and is threadably penetrated by a vertically disposed shoulder screw 93 which has fixedly mounted thereon a guide roller 96 comprising an inner ball bearing race 94 and an outer ball bearing race 95 which has free rotational movement around the inner race 94.

It may be observed in Figure 1 that the top table 50 has a plurality of horizontally disposed and downwardly projecting ribs 100 having T-slots 101 running longitudinally thereof (Figures 1, 2, 4 and 11). The T-slots 101 slidably receive the head portions of T-bolts 103 and these T-bolts 103 project downwardly from the ribs 100 and slidably penetrate an angle bar 102 which is adapted to be secured against the lower surfaces of the longitudinally disposed ribs 100 at substantially right angles thereto. The angle bar 104 has an upwardly projecting portion 106, in the center thereof, which extends upwardly through the slot 65 in the top table 50, and the top surface of which is flush with the top surface of the top table 50.

The upwardly projecting portion 106 of the angle bar 104 threadably receives the lower end of a shoulder screw 108 (Figure 11) which has rotatably mounted thereon a guide roller 110. The transverse angle bar 104 is secured to the top table 50 in the manner heretofore described so that the distance from the band-saw blade 29 to the guide roller 110 may be adjusted to accommodate differently sized or shaped patterns to be presently described.

Of particular importance are the positions of the rollers 96 and 110 relative to the saw 29 (Figures 1, 4 and 7). It will be noted that the axis of the first guide roller 96 extends in a vertical plane and is disposed in spaced relation and in a plane at right angles to the flat side of the saw, while the axis of the second roller 110 extends in a vertical plane and is also disposed in spaced relation to and in the plane of the cutting run of the saw. Thus, the axes of the first and second rollers 96 and 110 and the saw 29 each occupy one of the three junction points of a scalene right triangle, the rollers 96 and 110 being disposed at each end of the hypotenuse of the triangle.

The movable pattern table or planar pattern member, broadly designated at 120, as it is shown in the drawing, is for a typical pattern and is not necessarily the only shape of pattern that may be used in association with this invention.

The roller 110 engages an irregularly shaped groove 121 disposed in the lower surface of the pattern table 120 and closed at both of its ends. The pattern table 120 also has another irregularly shaped groove 122 in the lower surface thereof which is shaped differently from the groove 121, is open at one end and is adapted to be engaged by the guide roller 96.

The pattern table 120 is made of an easily worked material, such as wood, so that a conventional router tool may be used in the cutting of the grooves 121 and 122. The pattern table 120 has an irregularly shaped vertical surface 125 which in this instance is serpentine but may be of any desired shape to produce a desired shape in a work piece, such as a drawer front or the like, and this surface 125 is engaged by the raised portion 83 of the L-shaped bar 80 during the operation of this device.

Fixedly secured to the upper surface of the pattern 120 is a pair of strategically placed vertically disposed handles 126 which are secured thereto by any suitable means such as screws 127. These handles 126 are grasped by the operator of the machine when it is desired to move the pattern table 120 in a predetermined path guided by means of the grooves 121 and 122 of the pattern table 120 having the guide rollers 110 and 96 disposed in said grooves (Figures 1, 2 and 4). When the pattern table 120 and associated parts are too heavy for a single operator to move the same relative to the band-saw blade 29, another operator may assist the first operator by grasping portions of the pattern table 120 at or near its upper end as observed in Figures 2 and 4.

Fixedly secured to the upper surface of the pattern table 120, by any suitable means such as screws 131, and having one of their ends adjacent the irregularly shaped vertical surface 125 of the same, is a pair of spaced guide bars 130. These horizontally disposed guide bars 130 have longitudinally extending grooves 132, in their proximate sides, which are adapted to receive opposed edges of a plate 133 which has horizontally sliding movement in the grooves 132 (Figure 5). Fixedly secured to the plate 133, by any suitable means such as screws 134, is an angle bar 135 which has secured thereto, by any suitable means such as welding, an upwardly extending plate 136. The inner surface of this plate 136, or the left-hand surface as observed in Figure 3, is flush with the inner surface of the horizontally disposed plate 133 and the plates 134 and 136 as well as the angle bar 135 form a guide member broadly designated at 138 (Figures 3 and 5). The angle bar 135 has an outwardly extending ear 140 at each end thereof which extends outwardly over the top surfaces of the horizontally disposed guide bars 130.

Mounted on the vertical surface of each of the outwardly extending ears 140 is a lever 141 each of which is oscillatably mounted on a shoulder screw 142. Each of the levers 141 (Figure 5), which are oscillatably mounted at the ends of the angle bar 135, has a handle portion 145 and a blade portion 146. This blade portion 146 is adapted to engage a selected one of a plurality of grooves 143, which are transversely disposed in the upper surfaces of the horizontally disposed guide members 130. The grooves 143 in the horizontally disposed guide members 130 are spaced apart the equivalent of the thickness of the piece to be cut by the band-saw blade 29 and which is be hereinafter described.

Adapted to be disposed on the upper surface of the pattern 120 and between the horizontally disposed guide bars 130, is a work piece B which is the member which is to be cut by the band-saw blade 29. This work piece B projects beyond the irregularly shaped vertical edge 125 of the pattern table 120 and also projects beyond the band-saw blade 29 equivalent to the thickness of a member 150 (Figure 2) to be cut from the work piece B. At this time the guide member 138 is moved towards the band-saw blade 29 so that the front surface of the vertically disposed plate 136 is against the rear surface of the work piece B or against the right-hand surface as observed in Figure 3, and the work piece B is secured to the vertically disposed plate 136 of the guide member 138 by any suitable means such as screws 147.

This completes the description of the invention as it is when in use. However, before the pattern table 120 may be used, the irregular grooves 121 and 122 as well as the irregular vertical surface 125 must be accurately laid out and formed so that the relative movement of the pattern table 120 to the band-saw blade 29 may be insured as the grooves 121 and 122 guide the pattern table 120 by engagement with the guide rollers 110 and 96 so as to form the desired shaped member 150.

By referring to Figures 6, 9 and 10 there may be observed a layout tool, broadly designated at 160, which is used in laying out the irregularly shaped curves associated with this invention. Before the layout tool 160 is used however, a line representing the vertical surface 125 must be drawn or scribed on the lower surface of the pattern table 120. This line may be drawn by using a previously made member 150 as a pattern or it may be drawn by the use of conventional plotting instruments.

A slot or groove 161 is then cut through the pattern table 120. This slot or groove 161 is generally cut on a router machine and in cutting the slot or groove 161 the line which has heretofore been drawn or scribed and which conforms to the vertical surface 125 will be used as a guide line for the side of the router tool. In the cutting of the slot 161, not only the vertical surface 125 will be formed, but a parallel vertical surface 162 will be formed.

After the slot 161 has been cut through the pattern table 120, the end of the layout tool 160 is inserted in the slot 161, as will be presently described, and as shown in Figure 9. A plate 165 of the layout tool 160 is urged against the vertical surface 125 of the pattern table 120 by a compression spring 166 one end of which engages the plate 165. The compression spring 166 extends across the slot 161 and its other end engages a plate 167 a portion of which extends upwardly above the slot 161. The plate 167 is adapted to slide against the parallel vertical surface 162.

The downwardly projecting plate 165 of the layout tool 160 is integral with a horizontally disposed portion 170 which has a horizontally disposed restricted portion 171 integral therewith and which extends across the slot 161 and slidably penetrates the upper end of the plate 167. When the layout tool is not in use, that is, when the plates 165 and 167 are not disposed in the slot 161, the plate 167 is urged outwardly against a pin 172 which transversely penetrates the restricted portion 171 and retains the plate 167 on the restricted portion 171.

The vertically disposed plate 165 is of the same width as the band-saw blade 29 so that the path of the free end of the layout tool 160 will conform to a similar path that the band-saw blade 29 would cause if it had an extension arm connected to the same. The horizontally disposed plate 170, which is integral with the vertically disposed plate 165, rests on the top surface of the pattern table 120 when the pattern table 120 is in the inverted position shown in Figure 6 and the plate 170 has projecting towards the observer in Figure 6 a bar 173 which is slidably penetrated by a horizontally disposed bar 175. The horizontally disposed bar 175 is secured in the vertically disposed bar 173 by a thumb screw 176 which threadably penetrates the end of the vertically disposed bar 173 remote from the plate 170 and engages the horizontally disposed bar 175. It may be observed in Figure 9 that the center of the bar 175 is disposed directly above the vertically disposed surface 125 of the slot 161 so that the pencil 181, to be presently described is disposed in alinement with the vertical surface 125.

The horizontally disposed bar 175 extends outwardly and has disposed, on the free end thereof, a vertically disposed portion 177 which has a vertically disposed bore 180 therethrough (Figures 6 and 10) in which a conventional pencil 181 or other marking device is mounted and which is secured in the bore 180 by a set screw 182 which threadably penetrates the end of the vertically disposed portion 177.

The layout tool 160 is generally employed by first inserting the plates 165 and 167 near the upper end of the slot 161, as observed in Figures 6 and 9, and is placed in the dotted line position indicated at 185. The pencil 181, in the free end of the layout tool 160, engages the lower surface of the pattern table 120, as observed in Figure 1, or the surface nearest the observer in Figure 6, and by grasping the upwardly projecting portion 173 (Figure 9) and guiding the vertically disposed plates 165 and 167 along the slot 161, the layout tool 160 will be guided along the slot 161 to the successive dotted line position indicated at 186 and finally to the position shown in solid lines.

When the layout tool 160 is guided by the slot 161, the pencil 181 at the free end of the bar 175 will mark a guide line 187 on the surface of the pattern table 120 (Figure 6). The groove 121 is then cut, generally on a router machine, and the guide line 187, as shown on Figure 6, is followed by the center of the router cutter in the cutting of this groove 121.

After the groove 121 has been cut along line 187 in the manner heretofore described, the pattern table 120 is cut along the dotted lines 190 and 191 as shown in Figure 6, thus removing a portion 192 from the front surface of the pattern table 120 and thus leaving the vertical surface 125 unrestricted. The groove 122 as observed in Figures 2 and 4, is then cut in spaced relation to the vertical surface 125 by using a suitable router tool, guided by the surface 125 to thus duplicate the contour of surface 125. Therefore no special layout tool is required in the forming of the groove 122.

From this description, it is obvious that the vertical surface 125 may be of any desired shape and the guiding track, for any pattern that it is desired to make, may be ascertained by the movement or direction taken by the vertically disposed plate 165 which guides the layout tool 160 along the slot 161.

In the use of this invention, the pattern table 120 is placed on the top table 50 and by moving the open end of the groove 122 so that it is engaged by the guide roller 96, the space between the groove 122 and the vertical surface 125 will move the guide roller 96 away from the vertical leg 82 of the angle bar 80 and the vertical surface 125 will thus be urged against the raised portion 83 of the angle bar 80. This holds the vertical surface 125 in close proximity to the band-saw blade 29, but it will not serve as a satisfactory guiding means within itself, as it is manifest, that without a guiding track other than the groove 122, the pattern would incline to deviate in one or the other direction from the true line and consequently the cutting tool or band-saw blade 29 would not follow the pattern outline accurately.

Thus the groove 121 is provided and by placing the pattern table 120 so that the groove 121 is engaged by the guide roller 110, the pattern table 120 will always be guided in correct relation to the band-saw blade 29 as the operator moves the pattern table 120 away from the observer in Figures 2 and 4 to feed the work piece B towards the band-saw blade 29 by grasping the vertical handles 126.

After the member 150 has been cut off the work piece, it is merely necessary to return the pattern to the position shown in Figure 4 and then move the handles 145 of the levers 141 downwardly to the dotted line position shown in Figure 5. The guide member 138 is then moved toward the band-saw blade 29 until the blade portions 146 of the levers 141 are in alignment with the next transverse slots 143 in the horizontally disposed guide members 130 and then the levers 141 are moved to the solid line position shown in Figure 5.

It is thus seen that the blade portions 146 of the levers 141 will successively engage the grooves 143 in step by step relation as each member 150 is cut off the work piece B.

In the drawings and specification, there has been set forth a preferred embodiment of the invention, and although specific terms are employed, they are used in a generic and descriptive sense only and not for purposes of limitation, the scope of the invention being defined in the claims.

I claim:

1. In a woodworking machine for sawing irregularly shaped pieces of material, a framework, a table mounted on the framework, a vertically movable saw passing through the table, a roller mounted on the table and having a vertical axis, the axis of said roller being disposed in spaced relation and in a plane at right angles to the flat side of the saw, a second roller mounted on the table and having a vertical axis, the axis of the second roller being disposed in spaced relation to and in the plane of the cutting run of the saw, the axes of the rollers and the saw each occupying one of the three junction points of a scalene right triangle and the rollers being disposed at each end of the hypotenuse of said triangle, a movable table mounted for movement on the first-named table and having a circuitous edge conforming substantially to the shape of the piece of material to be sawed, the movable table having a circuitous groove in its lower side, the center line of the circuitous groove being generated by a point moving in parallel relation to the circuitous edge, the first-named roller being adapted to fit into said groove, the movable table having a second circuitous groove in its lower side, the center line of which conforms to a line made equidistant from, and at right angles to, the radius points of the circuitous edge, or, in other words, conforming to a line tangentially disposed relative to the circuitous edge and generated by a point moving equidistant relative to continuous moving points of tangency of the circuitous edge, the second-named roller being adapted to loosely fit in the second circuitous groove, means for securing a work piece on the movable table, movement of the movable table causing the work piece to move into engagement with the saw, the movable table being guided relative to the saw by engagement of the first-named roller in the first-named groove and by engagement of the second-named roller in the second-named groove to therefore cause the saw to cut a piece of material from the work piece conforming to the shape of the circuitous edge of the movable table.

2. In a woodworking machine comprising a band-saw, a table, a pattern table adapted to have movement on the table, said pattern table having an edge disposed next to the band-saw conforming substantially to the shape of the piece of material to be cut from a work piece, the pattern table having a groove disposed in the lower surface thereof having substantially the same curvature as the curvature of the finished piece to be cut from the work piece, the lower surface of the pattern table having a second circuitous groove therein which curves in accordance with a point moving in a line a fixed distance from but extending tangentially relative to the curvature of the first-named groove, a guiding member disposed on the first-named table in right-angular relation to the plane of the cutting run and having movement in the first-named groove in the bottom surface of the pattern table, a second guiding member disposed on the table in the plane of the cutting run and having movement in the second-named groove in the bottom of the pattern table, means for securing a work piece on the pattern table, the pattern table having handle means adapted to be engaged by an operator to feed the pattern table relative to the saw and whereby said grooves and guiding means will guide the pattern table to cause a piece of material to be cut from the edge of the work piece conforming in shape to the first-named groove in the pattern table.

3. In a woodworking machine for sawing irregularly shaped pieces of material, a framework, a table mounted on the framework, a vertically movable saw passing through the table, said table having a slot therein disposed at right angles to the saw and having a horizontally disposed shaft therein, a stud rising upwardly from one end of the shaft and having a roller mounted thereon, spring means urging the shaft and associated parts towards the saw, the axis of said roller being disposed in spaced relation and in a plane at right angles to the flat side of the saw, a second roller mounted on the table and having a vertical axis, the axis of the second roller being disposed in spaced relation to and in the plane of the cutting run of the saw, the axes of the rollers and the saw each occupying one of the three junction points of a scalene right triangle and the rollers being disposed at each end of the hypotenuse of said triangle, a movable table mounted for movement on the first-named table and having a circuitous edge conforming substantially to the shape of the piece of material to be sawed, the movable table having a circuitous groove in its lower side with its center line being generated by a point moving in parallel relation to the circuitous edge of the movable table, the first-named roller being adapted to fit into said groove, the movable table having a second circuitous groove in its lower side, the center line of which conforms to a line made equidistant from, and at right angles to, the radius points of the circuitous edge, or, in other words, conforming to a line tangentially disposed relative to the circuitous edge and generated by a point moving equidistant relative to continuous moving points of tangency, the second-named roller being adapted to fit in the second circuitous groove, means for securing a work piece on the movable table, movement of the movable table causing the work piece to move into engagement with the saw, said spring means serving to urge the circuitous edge of the movable table towards the side of the saw by engagement of the first-named roller in the first-named groove, the movable table being guided by the same and by engagement of the second-named roller in the second-named groove to therefore cause the saw to cut a piece of material from the work piece conforming substantially to the shape of the circuitous edge.

4. In a woodworking machine for sawing irregularly shaped pieces of material, a framework, a table mounted on the framework, a vertically movable saw passing through the table, said table having a slot therein disposed at right angles to the saw and having a horizontally disposed shaft therein, a stud rising upwardly from one end of the shaft and having a roller mounted thereon, spring means urging the shaft and associated parts towards the saw, an angularly shaped member mounted on the first-named table between the roller and the saw and having an upwardly extending raised portion slidably engaging the saw, an adjustable bar slidably engaging the opposite side of the saw and mounted on the first-named table, the axis of said roller being disposed in spaced relation to and in a plane at right angles to the flat side of the saw, a second roller mounted on the table and having a vertical axis, the axis of the second roller being disposed in spaced relation to and in the plane of the cutting run of the saw, the axes of the rollers and the saw each occupying one of the three junction points of a scalene right triangle and the rollers being disposed at each end of the hypotenuse of said triangle, a movable table mounted for movement on the first-named table and having a circuitous edge conforming substantially to the shape of the piece of material to be sawed, the movable table having a circuitous groove in its lower side and its center line being generated by a point moving in parallel relation to the circuitous edge of the movable table, the first-named roller being adapted to fit into said groove, the movable table having a second circuitous groove in its lower side, the center line of which conforms to a line made equidistant from, and at right angles to, the radius points of the circuitous edge, or, in other words, conforming to a line tangentially disposed relative to the circuitous edge and generated by a point moving equidistant relative to continuous moving points of tangency, the second-named roller being adapted to fit into the second circuitous groove, means for securing a work piece on the movable table, movement of the movable table causing the work piece to move into engagement with the saw, said spring means serving to urge the circuitous edge of the movable table towards the side of the saw to where it engages the upwardly extending portion of the angularly shaped member by engagement of the first-named roller in the first-named groove, the movable table being guided by the same and by engagement of the second-named roller in the second-named groove to therefore cause the saw to cut a piece of material from the work piece conforming substantially to the shape of the circuitous edge.

5. In a woodworking machine for sawing irregularly shaped pieces of material, a framework, a table mounted on the framework, a vertically movable saw passing through the table, a roller mounted on the table and having a vertical axis, the axis of said roller being disposed in spaced relation to and in a plane at right angles to the flat side of the saw, said table having a slot extending from the portion through which the saw passes to one edge thereof, an adjustable angle bar disposed beneath the table transversely of the slot and having a block integral therewith and extending upwardly in the slot to where its top surface is flush with the top of the table, a second roller mounted on the block and also having a vertical axis, said second roller thus being adjustable on a horizontal plane relative to the saw, the axis of the second roller being disposed in spaced relation to and in the plane of the cutting run of the saw, the axes of the rollers and the saw, each occupying one of the three junction points of a scalene right triangle and the rollers being disposed at each end of the hypotenuse of said triangle, a movable table mounted for movement on the first-named table and having a circuitous edge conforming substantially to the shape of the piece of material to be sawed, the movable table having a circuitous groove in its lower side and its center line being generated by a point moving in parallel relation to the circuitous edge of the movable table, the first-named roller being adapted to fit into said groove, the movable table having a second circuitous groove in its lower side, the center line of which conforms to a line made equidistant from, and at right angles to, the radius points of the circuitous edge, or, in other words, conforming to a line tangentially disposed relative to the circuitous edge and generated by a point moving equidistant relative to continuous moving points of tangency, the second-named roller being adapted to fit into the second circuitous groove, means for securing a work piece on the movable table, movement of the movable table causing the work piece to move into engagement with the saw, the movable table being guided relative to the saw by engagement of the second-named roller in the second-named groove to therefore cause the saw to cut a piece of material from the work piece conforming substantially to the shape of the circuitous edge.

6. In a woodworking machine for sawing irregularly shaped pieces of material, a framework, a table mounted on the framework, a vertically movable saw passing through the table, a roller mounted on the table and having a vertical axis, the axis of said roller being disposed in spaced relation and in a plane at right angles to the flat side of the saw, a second roller mounted on the table and having a vertical axis, the axis of the second roller being disposed in spaced relation to and in the plane of the cutting run of the saw, the axes of the rollers and the saw each occupying one of the three junction points of a scalene right triangle and the rollers being disposed at each end of the hypotenuse of said triangle, a movable table mounted for movement on the first-named table and having a circuitous edge conforming substantially to the shape of the piece of material to be sawed, the movable table having a circuitous groove in its lower side, the center line of the circuitous groove being generated by a point moving in parallel relation to the circuitous edge, the first-named roller being adapted to fit into said groove, the movable table having a second circuitous groove in its lower side, the center line of which conforms to a line made equidistant from, and at right angles to, the radius points of the circuitous edge, or, in other words, conforming to a line tangentially disposed relative to the circuitous edge and generated by a point moving equidistant relative to continuous moving points of tangency of the circuitous edge, the second-named roller being adapted to loosely fit in the second circuitous groove, means for securing a work piece on the movable table, movement of the movable table causing the work piece to move into engagement with the saw, the movable table being guided relative to the saw by engagement of the first-named roller in the first-named groove and by engagement of the second-named roller in the second-named groove to therefore cause the saw to cut a piece of material from the work piece conforming to the shape of the circuitous edge of the movable table, said means for securing the work piece on the movable table comprising a pair of spaced guide bars mounted on the movable table each side of the work piece, an angular guide member secured to that vertical surface of the work piece remote from the band-saw, said spaced guide bars having spaced transverse grooves in the top surfaces thereof, said angular guide member having sliding movement between the guide bars, a pair of handles oscillatably mounted on the angular guide member and each handle having a blade extending over the guide bars and adapted to be moved into engagement with the transverse slots in the guide bars in a step by step manner as the angular guide member is advanced towards the band-saw as each piece of material is removed from the work piece.

HUBERT M. BENGE.

REFERENCES CITED

The following references are of record in the file of this patent:

UNITED STATES PATENTS

| Number | Name | Date |
|---|---|---|
| 106,006 | Watkins | Aug. 2, 1870 |
| 273,000 | Wrigley | Feb. 27, 1883 |
| 275,807 | Crowell | Apr. 17, 1883 |
| 1,958,203 | Pfau | May 8, 1934 |
| 2,077,118 | Lewis | Apr. 13, 1937 |

FOREIGN PATENTS

| Number | Country | Date |
|---|---|---|
| 565,103 | France | Nov. 3, 1923 |